Feb. 7, 1956  E. P. LAMB  2,733,772
VENTILATED ENGINE COMPARTMENT
Filed May 2, 1952  2 Sheets-Sheet 1

INVENTOR.
ERNEST P. LAMB
BY
Harness and Harris
ATTORNEYS.

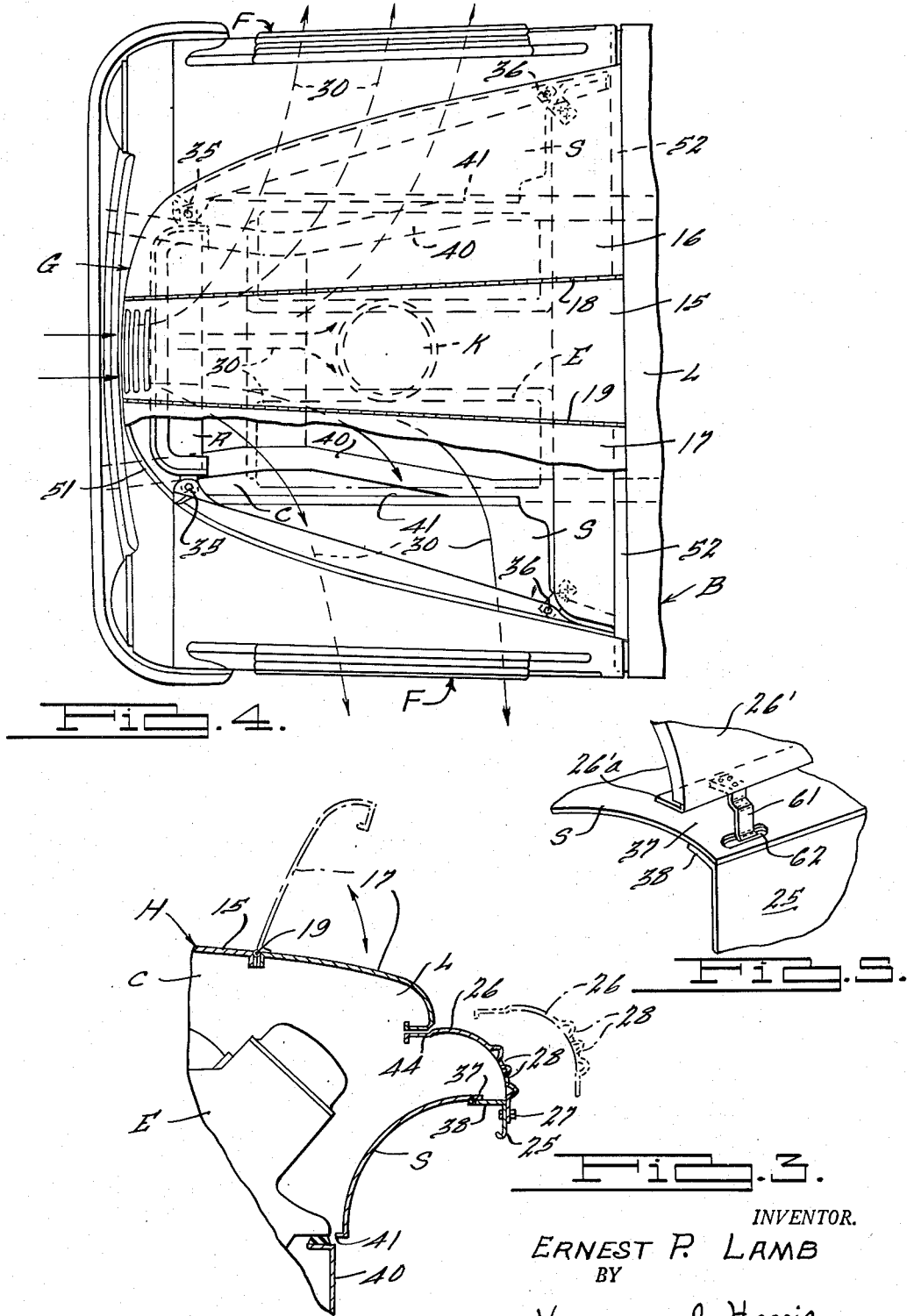

United States Patent Office 2,733,772
Patented Feb. 7, 1956

2,733,772

VENTILATED ENGINE COMPARTMENT

Ernest P. Lamb, Grosse Pointe, Mich., assignor to Chrysler Corporation, Highland Park, Mich., a corporation of Delaware Application May 2, 1952, Serial No. 285,753

2 Claims. (Cl. 180—69)

This invention relates to motor vehicle engine compartment design and particularly to means for ventilating the engine compartment such that maximum engine efficiency may be obtained at a minimum cost.

It is a primary object of this invention to form the bounding walls or sides of a motor vehicle engine compartment with suitable apertures and air flow baffle plates such that movement of the vehicle forwardly will force fresh cooling air to flow through the engine compartment in a predetermined manner whereby cool dense air may be continuously supplied to the engine carburetor and the warm air surrounding the engine block and radiator immediately removed from the engine compartment.

It is another object of this invention to provide a novel motor vehicle body front end construction wherein the radiator grille, the engine compartment hood and the front wheel fenders are so formed that maximum air change is attained in the engine compartment.

It is still another object of this invention to provide a novel front wheel fender construction that secures maximum air change within the engine compartment.

It is still another object of this invention to provide a novel type of built-up, front wheel fender having a removable section to facilitate engine repair and adjustment and associated splash shielding, baffle plating and louvers to control the flow of air through the engine compartment.

Other objects and advantages of this invention will become readily apparent from a reading of the subsequent description of this invention and a consideration of the related drawings embodying two forms thereof wherein:

Fig. 3 is a sectional elevational view of a portion of the body construction shown in Fig. 2, the view being taken along the line and in the direction of the arrows 3—3 of Fig. 2;

Fig. 4 is a top plan elevation of the front end construction shown in Figs. 1 and 2, portions of the hood and fenders being broken away to more clearly disclose certain features of this invention;

Fig. 5 is a fragmentary perspective view of a readily detachable type of connection that can be used between the fender sections.

Figures 1, 2:
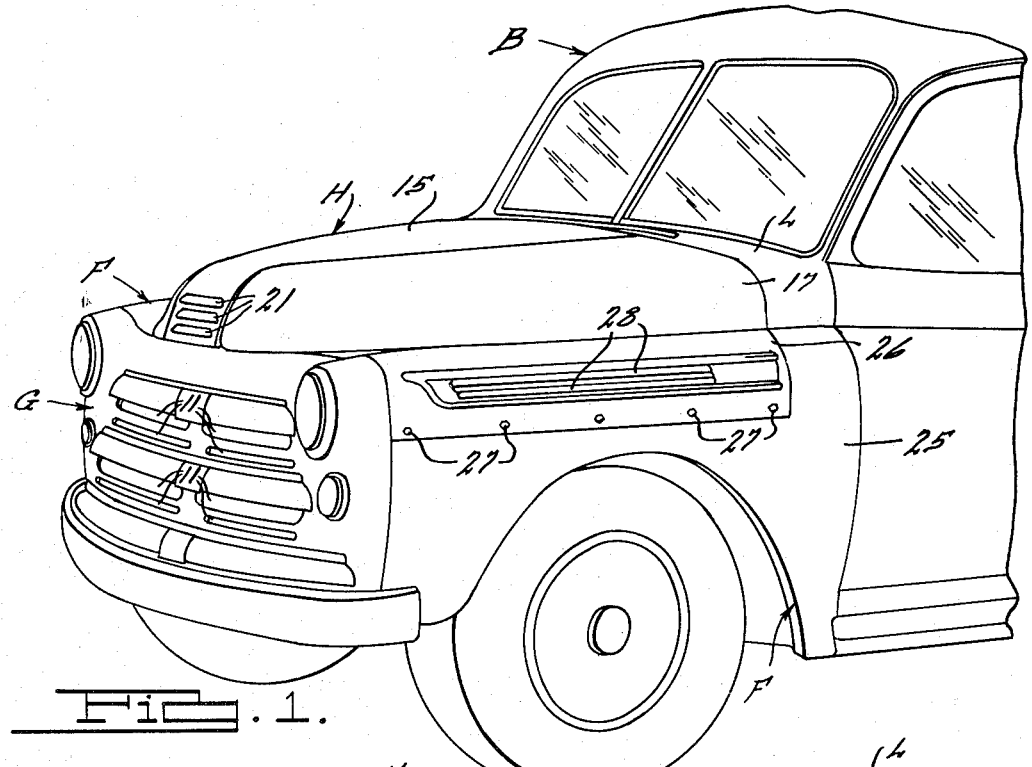
Fig. 1 is a perspective view of the front end portion of a motor vehicle that has the engine compartment walls constructed in accordance with this invention.
Fig. 2 is a side elevational view of the front end of the vehicle shown in Fig. 1, certain portions thereof being broken away and shown in section.

Fig. 1 of the drawings shows the front end of a motor vehicle body B that includes the louvered grille G, the louvered hood H, and the louvered front wheel fenders F. The grille G has a plurality of slot-like louvers 11 piercing its front face and arranged such that air may be passed therethrough and directed across the engine radiator R (see Fig. 4) located rearwardly of the grille G in the engine compartment C of the body B. Covering the top of the engine compartment C is the three section hood H that is composed of a relatively fixed center section 15 and the two swingably mounted side sections 16 and 17. Hinges 18 and 19 connect the side sections 16 and 17 respectively to the opposite sides of center section 15 so that the side sections may be swung upwardly in the fashion shown in broken lines in Fig. 3. The fixed center section 15 is provided with louver-like slots 21 across its front end to increase the air flow through the engine compartment C.

Each fender F is composed of two sections, namely, a lower substantially permanent section 25 and a readily removable top section 26. The removable top sections 26 may be connected to the permanent sections 25 by the bolt connectors 27. It will be noted that the removable fender sections 26 each have several longitudinally extending slots 28 along their side surfaces. These slots 28 provide the exit or exhaust ports for the air being forced into the engine compartment C through the front louvers 11, 21. As will be more clearly understood after reading the subsequent description of the construction of the engine compartment C, the air (see arrows 30) that is forced through the front louvers 11, 21 is directed rearwardly through the radiator R and across the inlet to the downdraft carburetor K and then out of the engine compartment C through the slots 28 in the fender sections 26. With the arrangement shown cool dense air is continuously fed to the carburetor K and also cool fresh air is continuously passed across the engine E so as to dissipate the heat produced by the engine. This continuous fresh air supply to the engine produces marked improvements in engine efficiency, particularly in truck engines that sometimes have to labor under excessive loads in extremely warm atmospheres. When the vehicle having the front end construction herein disclosed is moving forwardly, then fresh air is forced into the engine compartment C through the louvers 11, 21 in addition to being sucked into the compartment by the engine fan (not shown) that is mounted between the radiator R and the front end of the engine E.

Cooperating with the air inlet louvers 11, 21 and the air outlet louvers 28 in passing the cooling air through the engine compartment C are the splash shields S (see Figs. 3 and 4). The splash shields S extend from the grille G at the front end of the compartment C to the cowl wall L at the rear end of the engine compartment C. These shields S are supported at each end by the brackets 35, 36. The brackets 35 connect the front ends of the fender sections 25 and splash shields S to the grille G whereas the brackets 36 connect the rear ends of the fender sections 25 and splash shields S to cowl wall L. The upper edge 37 of each splash shield S is joined to the upper side 38 of each fixed fender section by welds or rivets or the like. Each splash shield S curves inwardly and downwardly from the associated fender section top surface 38 to a location adjacent the associated chassis frame side rail 40. The lower side edge 41 of each splash shield S is located close to the associated chassis frame side rail 40 so that a substantially closed engine compartment C is provided. Furthermore, the splash shields are shaped such that air entering the front of the compartment C through the louvers 11, 21 will pass rearwardly and strike the splash shields in such a manner that the air will be deflected out of the engine compartment C through the slots 28 in the removable upper fender sections 26. It will be noted that the upper wall or side 44 of each fender section 26 overhangs the splash shield S and thereby provides a U-shaped trough to receive the air that is deflected upwardly and outwardly by the splash shields S during passage of cooling air through the engine compartment C.

In addition to cooperating with the splash shields S to improve the ventilation of the engine compartment C, the removable upper fender sections 26 have another valuable function in that they greatly facilitate service and/or repair of the engine unit located in the engine compartment C. From a consideration of Fig. 3, it will be noted that when a fender section 26 is removed and the associated hood side section 17 moved to its open (broken line) position, then a service man has a clear area of operation for servicing and/or repairing the engine unit E. To remove the fender sections 26 it is merely necessary to remove the exteriorly mounted bolts 27. Another advantage of the removable fender sections 26 is that when operating under heavy load in very warm climates it may be necessary to get as much ventilation around the engine E as possible. Under such circumstances, the fender sections 26 can be removed from the front end construction and stowed away until the operating conditions are more favorable. When the fender sections 26 are removed then the movable hood sections 16, 17 are supported completely (see Fig. 4) by the stepped formations 51 on the grille G and the stepped formation 52 on the body cowl L. Cowl L provides the rear wall of the engine compartment C.

Fig. 5 shows a modified form of detachable connection 61 that can be used between the removable upper fender sections 26' and the fixed lower fender sections 25 instead of the bolt connectors 27 shown in Figs. 1–4. The removable upper fender sections 26', corresponding to sections 26 of Figs. 1–4, each have a flange 26'a along its lower edge that mounts several spaced, corrugated, flexible, strip-like, tabs 61. These tabs 61 are adapted to be positioned in the slots 62 that pierce the overlapping wall portions 37, 38 of the splash shields S and the fixed fender sections 25 respectively. The corrugated connections 61, 62 provide a quickly releasable connection for the removable fender sections 26'. The spring-like corrugations provide an inexpensive releasable connection between the upper and lower fender sections 25, 26'.

From the foregoing it is thought to be obvious that a motor vehicle front end construction has been provided that gives improved appearance as well as improved engine compartment ventilation and also facilitates servicing and repair and maintenance of the engine located within the engine compartment.

I claim:

1. A motor vehicle body having an engine compartment at the front end thereof defined by a radiator grille providing the compartment front wall, a hood providing the compartment top wall, a cowl wall providing the compartment rear wall, wheel fenders providing the compartment side walls, and a pair of splash shields each of which is supported on the interior side of a fender and arranged to extend inwardly and downwardly towards the bottom of the engine compartment, said radiator grille being slotted to provide for the forced draft admission of air to the forward end of said compartment during forward movement of the vehicle, said vehicle fenders comprising upper and lower detachably connected sections with the upper fender sections slotted to provide exhaust ports for the air passed into said compartment, the upper sections of said fenders that include the slotted formations being shaped to extend upwardly and inwardly towards the center of the engine compartment so as to overhang the associated splash shield and provide a longitudinally extending trough for gathering and discharging the air that is passed through the engine compartment, said hood comprising a longitudinally extending, centrally located, fixedly mounted section and a pair of movably mounted side sections that are movable into and out of engagement with the fender upper sections to provide service openings to the compartment.

2. A motor vehicle body having an engine compartment at the front end thereof defined by a radiator grille providing the compartment front wall, a hood providing the compartment top wall, a cowl wall providing the compartment rear wall, wheel fenders providing the compartment side walls, and a pair of splash shields each of which is supported on the interior side of a fender and arranged to extend inwardly and downwardly towards the bottom of the engine compartment, said radiator grille being slotted to provide for the forced draft admission of air to the forward end of said compartment during forward movement of the vehicle, said vehicle fenders comprising upper and lower detachably connected sections with the upper fender sections slotted to provide exhaust ports for the air passed into said compartment, the upper sections of said fenders that include the slotted formations being shaped to extend upwardly and inwardly towards the center of the engine compartment so as to overhang the associated splash shield and provide a longitudinally extending trough for gathering and discharging the air that is passed through the engine compartment, said hood comprising a longitudinally extending, centrally located, fixedly mounted section and a pair of movably mounted side sections that are movable into and out of engagement with the fender upper sections to provide service openings to the compartment and the forward end of the hood including slots for the admission of air to said compartment.

References Cited in the file of this patent

UNITED STATES PATENTS

| | | |
|---|---|---|
| 1,974,535 | Graffis | Sept. 25, 1934 |
| 2,041,522 | Breer | May 19, 1936 |
| 2,115,913 | Hicks | May 3, 1938 |
| 2,127,321 | Barnett | Aug. 16, 1938 |
| 2,153,535 | Gregorie | Apr. 11, 1939 |
| 2,162,526 | Buick | June 13, 1939 |
| 2,313,587 | Saurer | Mar. 9, 1943 |

FOREIGN PATENTS

| | | |
|---|---|---|
| 271,543 | Switzerland | Feb. 1, 1951 |
| 469,700 | Great Britain | July 30, 1937 |
| 500,684 | Great Britain | Feb. 14, 1939 |